United States Patent
Bast

(10) Patent No.: US 7,446,698 B2
(45) Date of Patent: Nov. 4, 2008

(54) PULSE-CODED REMOTE CALIBRATION OF AN ACTIVE PHASED ARRAY SYSTEM

(75) Inventor: Daniel Christopher Bast, Saskatchewan (CA)

(73) Assignee: Agence Spatiale Europeenne, Paris (FR)

(*) Notice: Subject to any disclaimer, the term of this patent is extended or adjusted under 35 U.S.C. 154(b) by 256 days.

(21) Appl. No.: 10/589,880

(22) PCT Filed: Feb. 27, 2004

(86) PCT No.: PCT/EP2004/002569

§ 371 (c)(1),
(2), (4) Date: Aug. 18, 2006

(87) PCT Pub. No.: WO2005/086285

PCT Pub. Date: Sep. 15, 2005

(65) Prior Publication Data

US 2008/0150793 A1 Jun. 26, 2008

(51) Int. Cl.
*G01S 7/40* (2006.01)
(52) U.S. Cl. .............................. 342/174; 342/195
(58) Field of Classification Search ............ 342/165, 342/173, 174, 194, 195
See application file for complete search history.

(56) References Cited

U.S. PATENT DOCUMENTS

| | | | | |
|---|---|---|---|---|
| 5,469,172 | A * | 11/1995 | Schleder et al. | 342/174 |
| 6,037,898 | A * | 3/2000 | Parish et al. | 342/174 |
| 6,124,824 | A * | 9/2000 | Xu et al. | 342/174 |
| 6,346,910 | B1* | 2/2002 | Ito | 342/174 |
| 6,384,781 | B1 | 5/2002 | Kautz et al. | |
| 2003/0050016 | A1* | 3/2003 | Boros et al. | 455/67.4 |
| 2003/0098809 | A1* | 5/2003 | Lindskog et al. | 342/174 |
| 2004/0203472 | A1* | 10/2004 | Chien | 455/68 |

FOREIGN PATENT DOCUMENTS

EP 0 752 736 A1 1/1997

OTHER PUBLICATIONS

R. Sorace, "Phase Array Calibration", IEEE Transactions on Antennas and Propagation, vol. 49, No. 4, Apr. 2001, pp. 517-525.

S. Silverstein, "Application of Orthogonal Codes to the Calibration of Active Phased Array Antennas for Communication Satellites", IEEE Transactions on Signal Processing, vol. 45, No. 1, Jan. 1997, pp. 206-218.

(Continued)

*Primary Examiner*—John B Sotomayor
(74) *Attorney, Agent, or Firm*—Clark & Brody

(57) ABSTRACT

A method for remotely calibrating an active phased array system, and more particularly an antenna, (APA), used in transmission and/or in reception, comprising transmitting and/or receiving a set of calibration pulses (RCP, TCP). Contrarily to methods known from the prior art, in which a reference signal is transmitted together with the calibration pulses in order to be able to perform a coherent detection of the calibration pulses at a remote station (GS), the method of the invention comprises incoherent demodulation of the calibration pulses and use of a signal processing procedure to account for the phase noise and amplitude fluctuations resulting from said incoherent demodulation. The method of the invention is particularly well suited for space applications, in which the active phased array system is an active phased array (APA) carried by a satellite (SAT) and the remote station (when it is present) is a ground station (GS).

21 Claims, 7 Drawing Sheets

OTHER PUBLICATIONS

Figure 1:
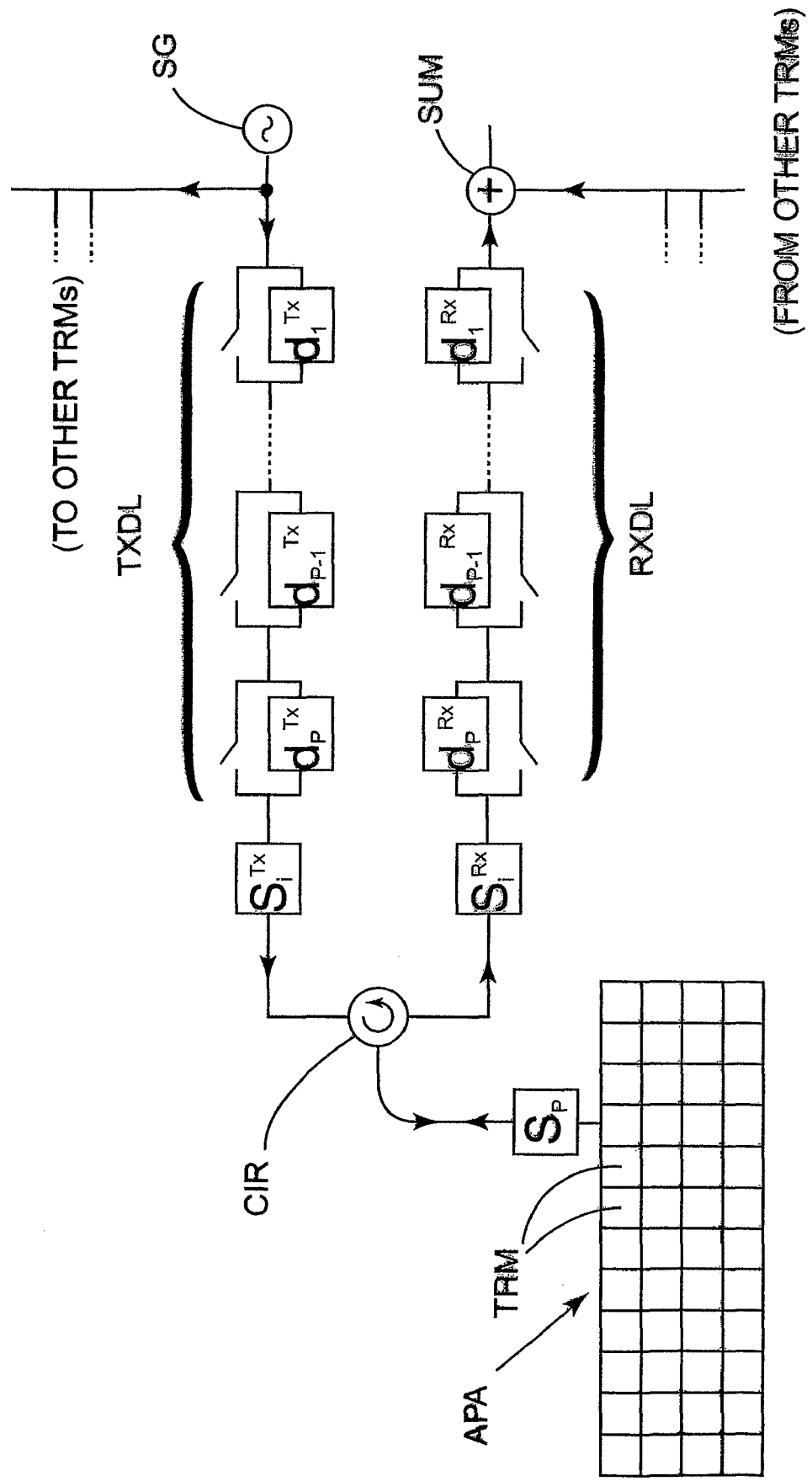

D. Purdy, et al., "In Orbit Active Array Calibration for NASA's LightSAR", IEEE Radar Conference, Apr. 1999, pp. 172-176.

Y. Desnos, et al., "The ENVISAT ASAR Calibration and Validation Plan", CEOS Workshop, Oct. 1999, pp. 1-9.

* cited by examiner

PULSE-CODED REMOTE CALIBRATION OF AN ACTIVE PHASED ARRAY SYSTEM

The invention relates to a remote calibration scheme for an active phased array system, more particularly for an active phased array antenna used in transmission and reception, and even more particularly for a satellite-borne synthetic aperture radar (SAR) antenna. Calibration in this document implies the process of characterizing the system such that systems effects can be corrected in product data.

An active phased array antenna is constituted by an array of N transmit/receive modules (TRM), all connected to a common signal generator and each having a radiating element. Between the signal generator and the radiating element of each module there is a variable transmission delay line, usually constituted by a serial arrangement of p phase shifters that can be individually switched in and out.

Calibrating the active phased array antenna means determining the complex gain of all the N·p phase shifters and of the signal path of each module when no phase shifter is switched in (straight-through path). A first calibration is usually performed before launching the satellite, but aging of the electronic components and deformation of the antenna make in-orbit remote calibration necessary, too.

Active phased array antenna can also include attenuators, which can be switched in or out like the phase shifters, and which require calibration as well. In the following, only phase shifters are considered, but inclusion of attenuators is straightforward, since both kinds of devices are characterized by a complex gain value.

Two kinds of calibration procedures are known in the prior art: external and internal.

In internal calibration of the transmit path, an internal calibration loop collects and sums together the signal generated by each TRM, just before the radiating elements. This technique allows a calibration of the portion of the signal path at the interior of the calibration loop, but it does not provide any information on the complex gain of the radiating elements or the geometrical phase effects due to deformation of the antenna outside the calibration loop.

External calibration consists in detecting the emission of the active phased array antenna in the far field for a certain number of known configurations and using this information to compute estimations of calibration parameters. This is technically more demanding and less accurate, but is the only way to obtain calibration data on elements not contained in the calibration loop.

The conventional way to perform internal as well as external calibration uses a series of calibration pulses. In each series, only one module, or sub-group of modules is active, and the phase delay elements are introduced one by one. For internal calibration, recording the calibration pulses allows a direct determination of all the complex gains. For external calibration, the phase delay elements remain at a fixed setting as the satellite overflies a ground station and the series of pulses are sent. Recording the signals allows determination of the combined antenna pattern but not the module or subgroup of modules complex gains.

This is described in the article "The ENVISAT ASAR Calibration and Validation Plan", CEOS SAR Workshop, Toulouse, 26-29 Oct. 1999, by Y. L. Desnos, H. Laur, J. L. Suchail, R. Torres, B. Duesmann and J. Closa.

Document EP 0 752 736 discloses an improved transmit-path external calibration technique, based on the use of different, nontrivial configurations of the active phased array during the calibration procedure. This technique comprises sending 2N(p+2) calibration pulses from the satellite to a receiving ground station, using all the modules simultaneously. The phase shift elements are switched in and out following specific encoding patterns based on rank N Hadamard matrices (this requires that N is a power of 2, but it is possible to add to any APA antenna a certain number of "imaginary" TRMs, which will turn out to have a zero complex gain, in order to match this condition). The main advantages of this technique over the conventional one are: an increase of the order of 2N of the signal-to-noise ratio (SNR), mimicking of actual imaging conditions, and possibly shorter calibration sequences.

The signal-processing algorithm used is described in greater detail in the article "Application of Orthogonal Codes to the Calibration of Active Phased Array Antennas for Communication Satellites" from S. D. Silverstein, IEEE Transactions on Signal Processing, vol. 45, page 206-218, 1997.

The use of Hadamard matrices is not essential, and other invertible bipolar matrices (i.e. matrices whose elements are +1 and −1) could be used; however Hadamard matrices are optimal in the sense that they provide the estimates with the least mean square error. In the following, any calibration technique based on the use of calibration pulses emitted using nontrivial configurations of the active phased array antenna will be denoted as "Pulse Code Calibration", or PCC.

PCC external calibration requires coherent demodulation of calibration pulses. The atmosphere, the time-varying position of the satellite and the phase noise of modulation and demodulation oscillators introduce parasitic phase terms, which affect the accuracy of external calibration, and could even make it meaningless. Some form of carrier retrieval is therefore necessary.

Document EP 0 752 736 discloses the use of a satellite-to-ground reference continuous signal at a frequency near to that of the calibration pulses in order to perform coherent demodulation. Apart from being energy consuming, this reference signal has to be transmitted from a communication sub-system using a dish or horn antenna, which is supposed to be well calibrated. Therefore, this solution adds hardware complexity to the satellite.

In an article entitled "In Orbit Active Array Calibration for NASA's LightSAR", published in the Proceeding of the 1999 IEEE Radar Conference, pages 172-176, D. S. Purdy and A. Jacomb-Hood have suggested to perform PCC without using a continuous reference signal. However, this requires some critical assumptions: precise knowledge of the satellite position, neglect of atmospheric effects and, most important, coherence of the satellite and ground station local oscillators over a significant time, at least 1 second. In certain applications (e.g. SAR operating in certain frequency bands) the validity of these assumptions is doubtful; in any case, requirements on the local oscillators stability are quite stringent.

An object of this invention is to provide a novel PCC scheme for calibrating the transmit and/or the receive path of an active phased array antenna.

Another object is to provide a novel PCC scheme that does not require a continuous reference signal.

Still another object is to provide a novel PCC scheme that allows relaxing hardware requirements (stable oscillators, well-calibrated communication sub-system antenna . . . ) by making use of improved signal processing algorithms.

A first embodiment of the invention uses bi-directional pulsed calibration and reference signals, both transmitted and received using the APA antenna under calibration. Information in a digital format is transmitted to a ground station either using the same APA antenna or a communication sub-system, which is not required to have a well-known complex gain.

A second embodiment of the invention does not even require a ground station: the satellite calibrates itself by transmitting calibration and reference pulses to the ground and by receiving the corresponding reflections.

In a third embodiment, pulsed reference signals are absent, and pulsed calibration signals are self-sufficient.

An object of the present invention is a method for remotely calibrating a phased array system, comprising a number of transmit and/or receive modules, wherein the transmit gain of each transmit and/or receive module can be set to one of a first collection of complex values, and/or the receive gain of each transmit and/or receive module can be set to one of a second collection of complex values, said method comprising the steps of:

i) generating a first and a second carrier signal;
ii) generating a first pulse train by modulating said first carrier signal and transmitting it using the phased array system, wherein the transmit gain values of the transmit and/or receive modules are set according to a pattern that changes during the transmission of said first pulse train; and/or receiving a second pulse train, generated by modulating said second carrier signal, using the phased array system (APA), wherein the receive gain values of the transmit and/or receive modules are set according to a pattern that changes during the reception of said first pulse train;
iii) demodulating said first pulse train using the second carrier signal and/or said second pulse train using the first carrier signal, in order to determine a first and/or second series of complex amplitude values, wherein said first series of complex amplitude values is a first invertible function of said transmit gains of all the transmit and/or receive modules, affected by at least a first parasitic phase contribution, and/or said second series of complex amplitude values is a second invertible function of said receive gains of all the transmit and/or receive modules, affected by at least a second parasitic phase contribution;
iv) communicating said first and/or second series of complex amplitude values to a calibration elaboration unit;
v) removing said first and/or second parasitic phase contributions from said first and/or second series of complex amplitude values to obtain estimates of said first and/or second invertible functions;

wherein step v) comprises the operations of:
a. determining first estimates of each individual complex value belonging to said first and/or second collection of complex values from a priori knowledge of the transmit and/or receive complex gain of each transmit and/or receive module;
b. computing first estimates of said first and/or second invertible functions from said first estimates of each individual complex value belonging to said first and/or second collection of complex values;
c. computing estimates of said first and/or second parasitic phase contributions by removing said estimates of the first and/or second invertible functions from said first and/or second series of complex amplitude values;
d. modifying said estimates of the first and/or second parasitic phase contributions by adding a first and/or second simulated phase noises, both having a pre-determined standard deviation and a non-uniform statistical distribution;
e. updating said estimates of said first and/or second invertible functions by removing from said first and/or second series of complex amplitude values the modified estimate of the parasitic phase contributions determined in operation d.
f. updating the estimates of the individual complex values belonging to said first and/or second collections by inverting said updated estimates of said first and/or second invertible functions;
and reiterating operations b. to f.

The conjunction "and" relates to the case where both the transmit and receive path are calibrated, while "or" accounts for the possibility of applying the method to the transmit path only or to the receive path only.

Optionally, step v) further comprises comparing said estimates of said first and/or second invertible functions with said "a priori" knowledge of the transmit and/or receive gain of each transmit and receive module in order to reject aberrant estimates and to replace them with predetermined values.

Advantageously, the pre-determined standard deviation of said first and/or second simulated phase noise is modified from one iteration of step v) to another in order to ensure the convergence of the estimation procedure.

Advantageously, the transmit and/or receive gain values of the transmit and/or receive modules are set according to a pulse-coded calibration encoding pattern for at least a first subset ("calibration pulses") of the pulses belonging to said first and second pulse train and operation f. of step v) of the method comprises performing a pulse-coded calibration decoding of said first subset of pulses.

In some embodiments of the invention, said first and/or second series of complex amplitude values are also affected by a third parasitic phase and amplitude contribution (e.g. a "range" contribution), which depends on a first set of measurable physical parameters (e.g. distance between the system under calibration and a remote station). Advantageously, said third parasitic phase contribution is removed before performing step v) of the method by making use of a measurement (e.g. a GPS position measurement, possibly complemented by measurements on the pulse trains themselves) of said first set of physical parameters.

In some embodiments of the invention, wherein said first and/or second series of complex amplitude values are also affected by a fourth parasitic phase, or phase and amplitude, contribution, which depends on a second set of physical parameters (e.g. properties of the medium through which the pulse propagate, such as the atmosphere) which vary on a time scale much longer than the interval separating two pulses of said first and/or second pulse train ("low frequency"). Advantageously, said fourth parasitic phase, or phase and amplitude, contribution is removed before performing step v) of the method.

According to one embodiment of the invention, the transmit and receive gain values of the transmit and/or receive modules are set according to a pulse-coded calibration encoding pattern for only a first subset ("calibration pulses") of the pulses belonging to said first and second pulse train, while they are set according to a fixed pattern for a second subset of the pulses ("reference pulses"), said second subset being used to remove said fourth parasitic phase, or phase and amplitude, contribution, but not to perform step v) of the method.

Advantageously, removal of said fourth parasitic phase, or phase and amplitude, contribution comprises repeatedly fitting said fourth parasitic phase, or phase and amplitude, contribution with suitable fitting functions (e.g. polynomials of increasing orders) until a suitable stop criterion is met, such as the fact that the cross-correlation between said first and second series of complex amplitude values (if both are present) reaches a minimum.

According to a first embodiment of the invention, said first and/or second parasitic phase contributions are originated by hardware-induced phase noises affecting said first and second carrier signals.

According to said first embodiment, said first carrier signal is generated by a first local oscillator co-located with the phased array system and said second carrier signal is generated by a second local oscillator located at a remote station which receives said first pulse train and/or transmits said second pulse train, and wherein said first and second carrier signal may be mutually incoherent.

Alternatively, according to a second embodiment of the invention, said first and second carrier signals are both generated by a local oscillator co-located with the phased array system and are both transmitted from said phased array system, reflected by a remote reflecting target and received by the same phased array system, and wherein said first and second parasitic phase contributions are originated by variations in the radar cross section of said remote reflecting target (e.g. roughness).

Advantageously, the receive gain values of the transmit and receive modules are set according to a fixed pattern during reception of the first pulse train and wherein the transmit gain values of the transmit and receive modules are set according to a fixed pattern during transmission of the second pulse train. The first and second pulse train can be interleaved.

The method of the invention is particularly well suited for space applications, where said phased array system is an antenna carried by a satellite, said remote station (in the case of the first embodiment) is a ground station and said remote reflecting target (in the case of the second embodiment) is a ground target.

Figure 2:
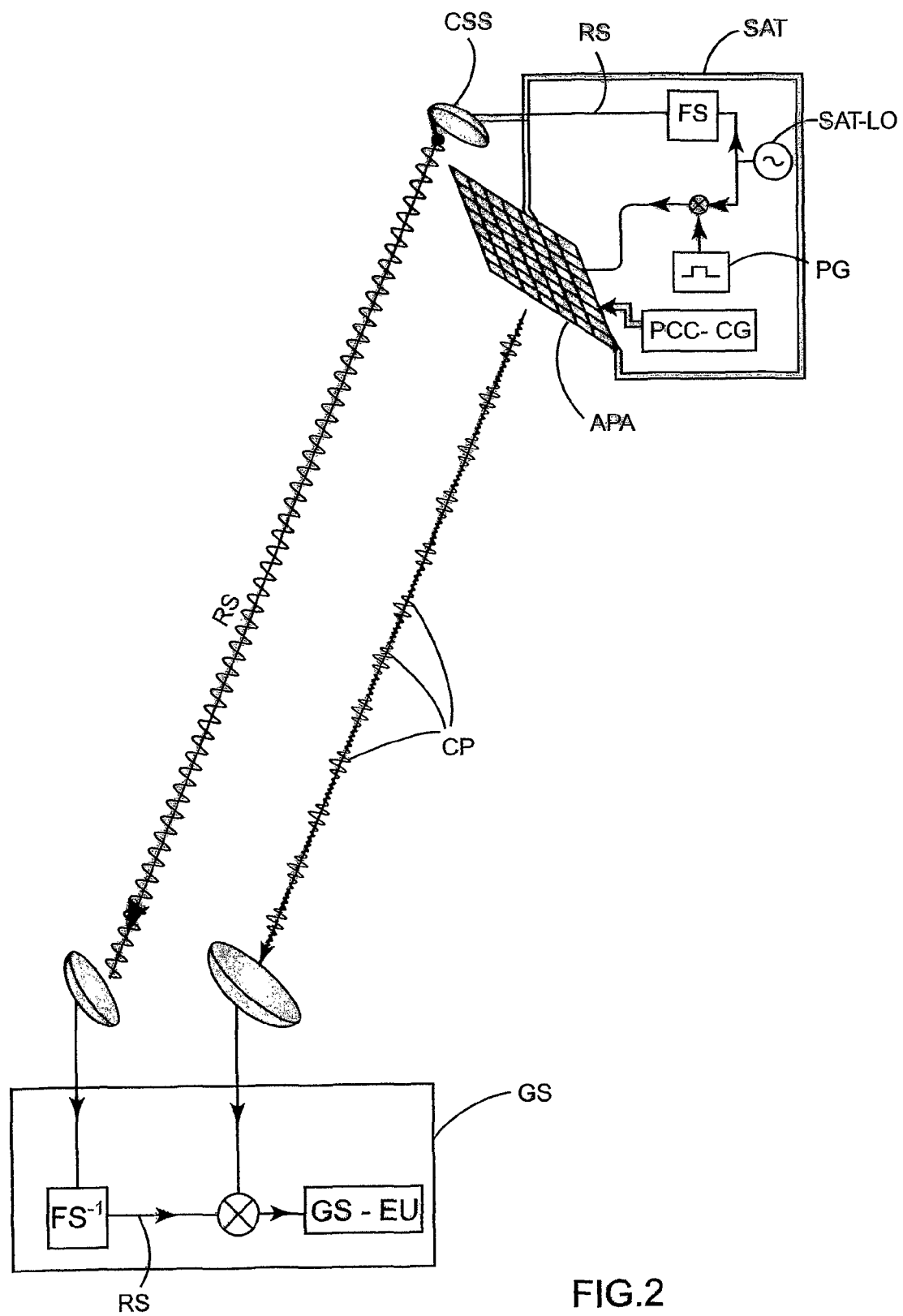
Figure 3:
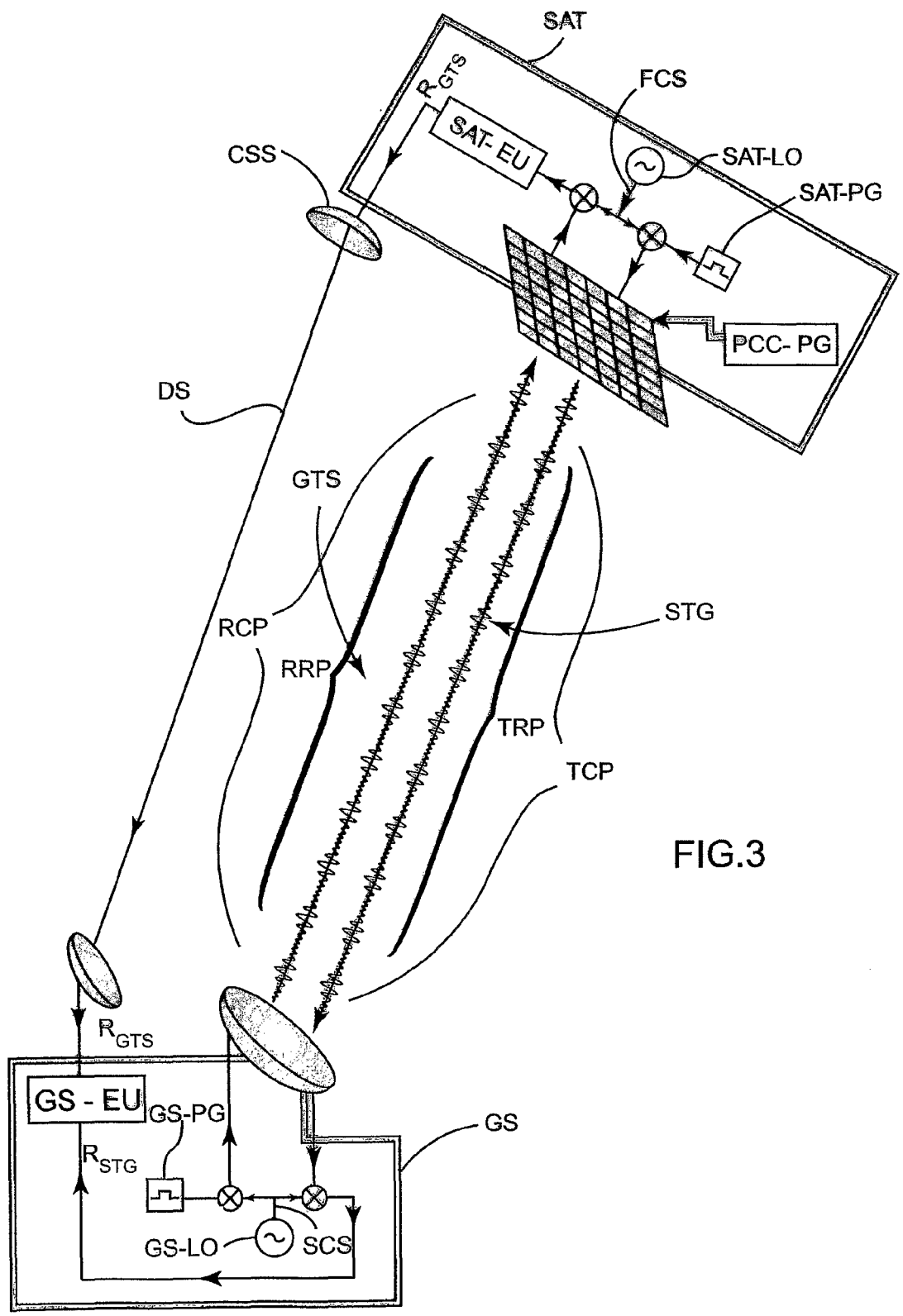
Figure 4A:
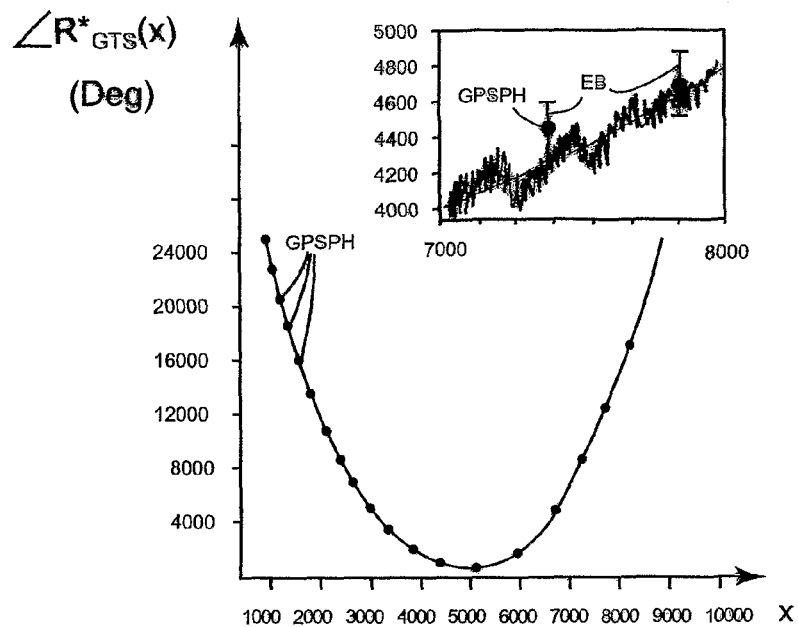
Figure 5:
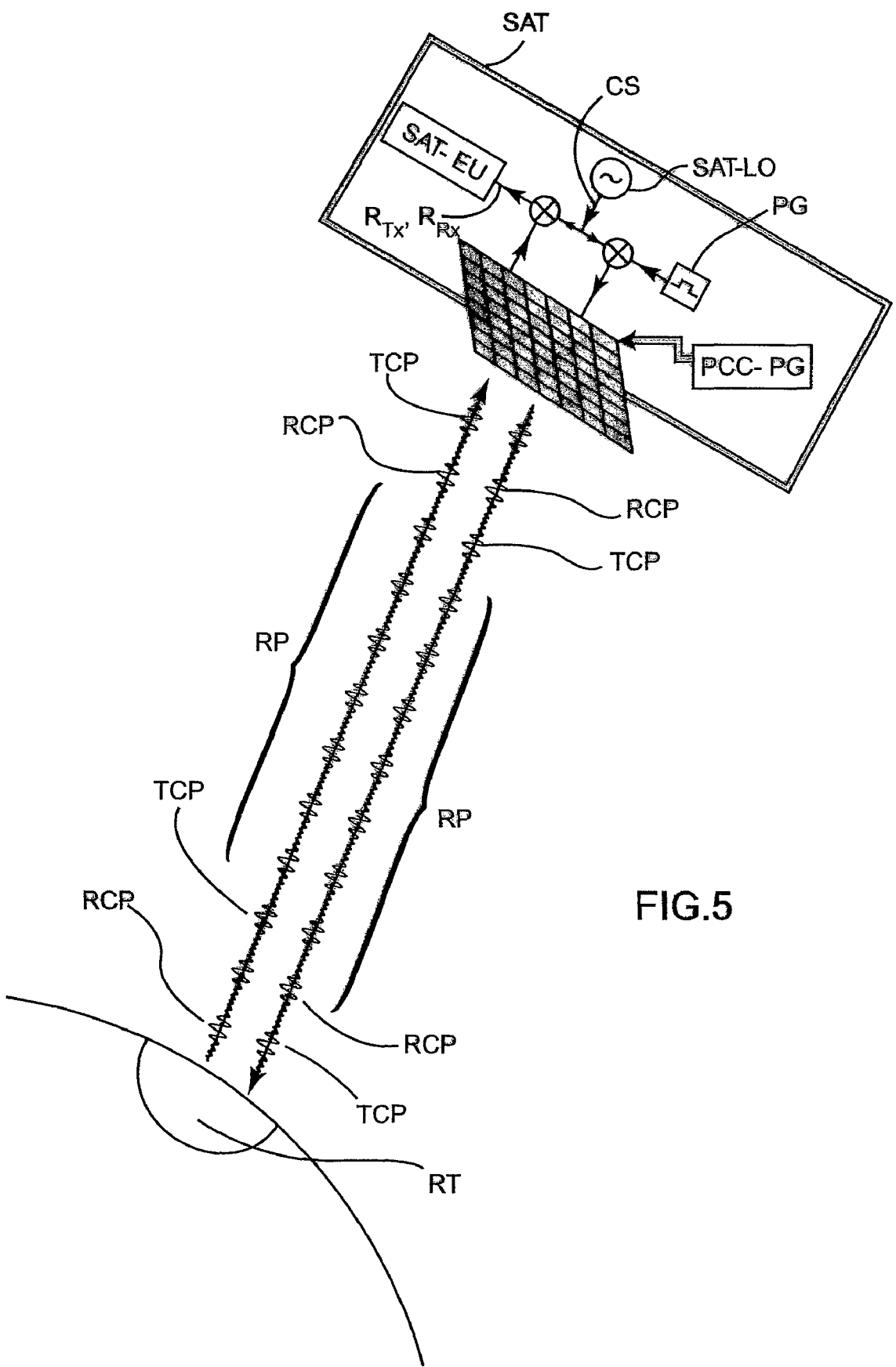
Figure 6:
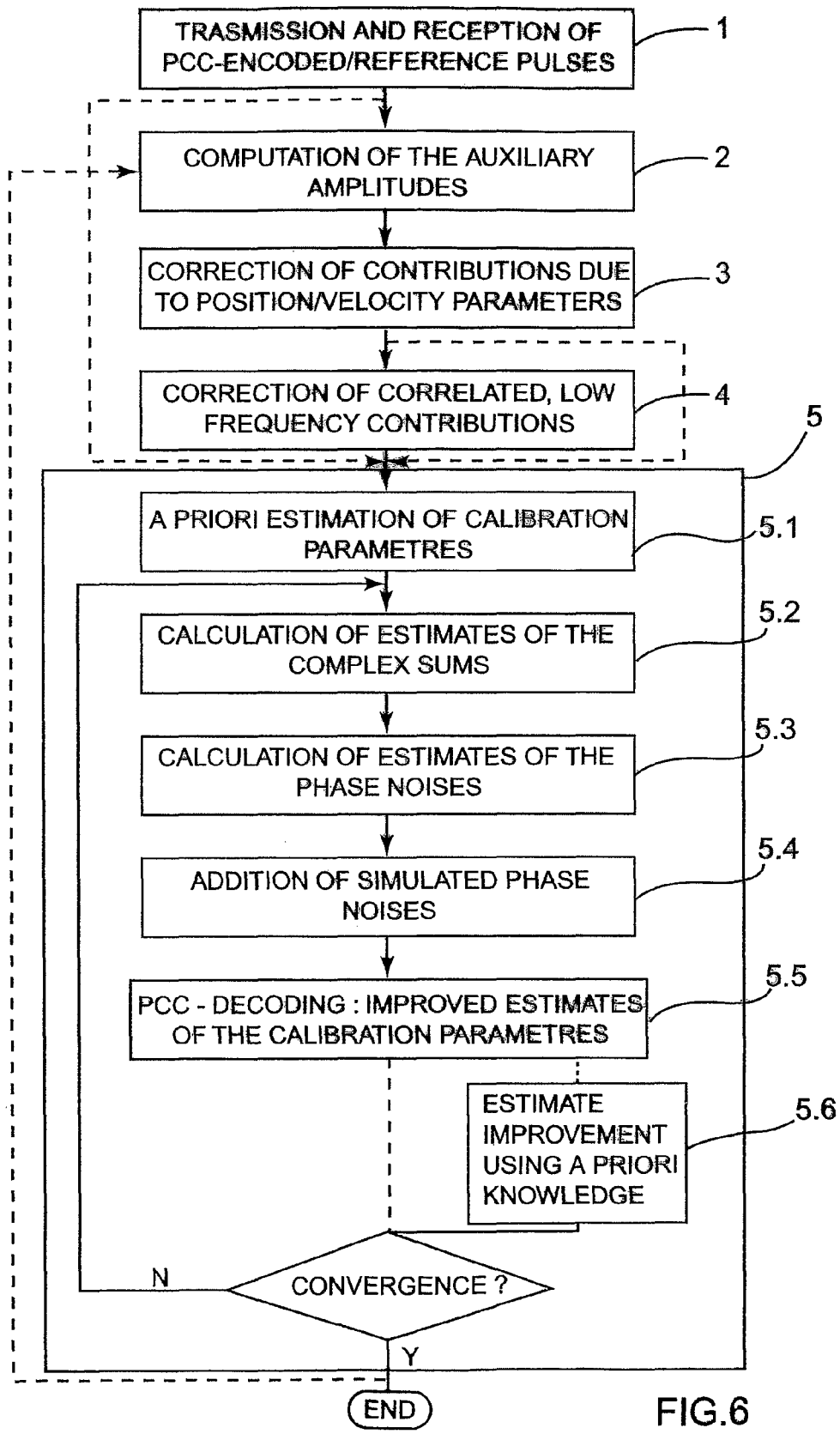

Additional features and advantages of the present invention will become apparent from the subsequent description, taken in conjunction with the accompanying drawings, which show:

FIG. 1, a schematic representation of an active phased array antenna that can be calibrated according to the method of the invention;

FIG. 2, a diagram of a pulse-coded calibration scheme known from the prior art;

FIG. 3, a diagram of a calibration method according to a first embodiment of the invention;

FIG. 4A, the phase history of raw calibration data (the inset is a magnified view of part of the figure);

FIGS. 4B to 4F calibration data at different stages of a signal processing procedure used in the method of the invention;

FIG. 5, a diagram of a calibration method according to a second embodiment of the invention; and FIG. 6, a flow-chart of the method of the invention.

FIG. 1 shows an active phased array antenna APA, constituted by a bi-dimensional array of N transmit/receive modules TRM, all connected to a common signal generator SG. Between the signal generator and the radiating element of each TRM there is a variable transmission delay line TXDL, usually constituted by a serial arrangement of p transmission phase shifters $d_1^{Tx}, \ldots, d_p^{Tx}$ which can be individually switched in and out. Typically, phase shifter $d_1^{Tx}$ introduces a 180° phase shift, shifter $d_2^{Tx}$ a 90° phase shift and so on, down to the $180° \cdot 0.2^{-(p-1)}$ phase of shifter $d_p^{Tx}$; phase shifters unavoidably introduce a gain attenuation and are therefore characterized by a complex gain, which is indicated by $d_1^{Tx}, \ldots, d_p^{Tx}$ as well. Optionally, independent gain attenuators can also be present (not shown): this would not change the calibration procedure, only more calibration pulses would be necessary. The overall complex gain of each TRM further comprises a non-settable "straight-through path" contribution $S_n^{Tx}$, which depends on the physical length of the path and on all the electronic elements the signal pass through.

The same radiating elements used for transmission can simultaneously serve as receptors thanks to circulators CIR. The signals received by each TRM are phase-delayed by a variable reception delay line RXDL, usually constituted by a serial arrangement of p reception phase shifters $d_1^{Rx}, \ldots, d_p^{Rx}$, as for transmission (in principle, the number of shifters could be different in reception and transmission, but this possibility is neglected in the following), and are finally combined by a summing node SUM. Similarly to the transmission path, the overall complex gain of each TRM further comprises a non-settable "straight-through path" contribution $S_n^{Rx}$.

More precisely, the "straight-through path" contributions comprise a "passive" component, $S_p$, which is essentially due to the radiating elements and to the antenna geometry, and therefore is common to the transmission and reception paths, and an "internal" component $S_i^{Tx}, S_i^{Rx}$, due to active electronics devices, which is dependent on the signal direction. The passive component $S_p$ is particularly important, because it includes the geometrical path between a TRM and the ground station (or, more exactly, the difference between this geometrical path and the distance between the center of the antenna and the ground station), therefore it accounts for most of the effects of a deformation of the APA antenna (such a deformation can also affect the internal straight-through paths). As the passive straight through path is common to the transmission and reception paths, it introduces the same phase delay; the attenuation can be different, due to impedance mismatch, but, for the sake of simplicity, this possibility is neglected in the following.

By switching in and out the shifters of each TRM, also taking into consideration the "straight-through path" contributions, it is possible to modify the radiation pattern of the APA antenna, in transmission as well as in reception.

On FIG. 1, only one transmission and one reception delay line are shown, but it has to be understood that a pair of such lines is associated to each TRM.

Calibrating the active phased array antenna APA means determining the 2(p+1) complex values of $d_1^{Tx}, \ldots, d_p^{Tx}, S_n^{Tx}, d_1^{Rx}, \ldots, d_p^{Rx}, S_n^{Rx}$ for each of the N TRM modules.

The description of the invention will be made with reference to ESA TerraSAR-L satellite, which operates in the L-band, at a frequency F=1.258 GHz. Its APA antenna has 140 TRM with p=6 phase shifters in transmission as well as in reception. Since 140 is not a power of two, for PCC a value of N=256 is assumed. This means that the procedure of document EP 0 752 736 requires the transmission of 4096 pulses for calibration of the transmit path. Actually, two orthogonal polarizations ("vertical" and "horizontal") can be used: if calibration has to be performed for both, the total number of calibration pulses is doubled.

Transmit path calibration according to the teaching of document EP 0 752 736 is schematically represented in FIG. 2. On board of satellite SAT a carrier is generated by a satellite local oscillator SAT-LO and split in two separated sinusoidal signals. The first sinusoidal signal is modulated by a train of square pulses generated by a pulse generator PG and directed to the APA antenna, which is set into the PCC configurations by a PCC configuration generator PCC-CG to generate a sequence of calibration pulses CP. The second is slightly frequency-shifted by a frequency shifter FS and transmitted by a well-calibrated communication sub-system antenna CSS to constitute a reference signal RS.

If at the ground station GS, the calibration pulses were coherently demodulated by a ground station local oscillator, the demodulated signal corresponding to the x-th calibration pulse would be (apart from a constant phase factor):

$$R(x) = C_{sum}^{Tx}(x)A(x)r(x)e^{i\phi(x)}$$

where $C_{sum}^{Tx}(x)$ is the "complex sum" term containing all the information used by a ground station elaboration unit (GS-EU) to perform calibration, while $A(x)$, $r(x)$ and $\phi(x)$ are "parasitic" complex gains (here and in the following, a specific pulse is identified by the discrete parameter "x").

From the physical point of view, $C_{sum}^{Tx}(x)$ is the value, at the ground station, of the interference pattern of the field emitted by the different TRMs.

Concerning the "parasitic" complex gains, $A(x)$ accounts for the effect of the atmosphere, $r(x)$ is the range contribution, accounting for the time and velocity varying Doppler effects between the satellite and the ground station, and $\phi(x)$ is a phase noise which depends on the randomly varying phase offset between the mutually incoherent satellite and ground station local oscillators, as well as on other hardware effects, such as the time-varying complex gain of RF amplifiers, timing errors of samplers, etc. For this reason, in the procedure of document EP 0 752 736, the reference signal RS is also coherently linked to the second demodulator (after being back-frequency shifted by a second frequency shifter $FS^{-1}$) used to perform the coherent demodulation. The calibration and the reference signal have a common origin (SAT-LO), thus atmospheric, range and phase noise contributions are the same or if frequencies are significantly different a model can be used to account for any differences.

In the article of D. S. Purdy and A. Jacomb-Hood cited above, there is no reference signal, $A(x)$ and $\phi(x)$ are neglected and $r(x)$ is calculated from a precise knowledge of the satellite orbit.

The first embodiment of the invention, called "pulsed reference scheme", is represented in FIG. 3. There is no continuous reference signal; instead, a first train of pulses (STG) is transmitted from the satellite SAT to the ground station GS and simultaneously, (within an accuracy which, in the case of the TerraSAR-L satellite is of the order of microseconds) a second train of pulses (GTS) is transmitted from the ground station to the satellite. In the following "GTS" means "ground-to-satellite" and "STG" means "satellite-to-ground".

The large majority of STG pulses are "reference" pulses used for transmit-path calibration (TRP): this means that they are transmitted by the APA antenna set in a "nominal" configuration, which is not used for PCC. This nominal configuration can be the one that is subject to the least incertitude, i.e. with no phase shifter switched in, or it can be chosen to optimize the SNR at the ground station. For example, only one pulse in six is a real "calibration" pulse (TCP) used for transmit-path PCC.

The GTS pulses are all the same, as the ground station antenna is not an active phased array one, but the majority of them are considered as reference pulses (RRP) and are received with the APA antenna set in a nominal configuration, while one in six is a calibration pulse used for receive-path PCC (RCP). GTS pulses are received simultaneously (within said microseconds accuracy) to the transmission of STG pulses.

Both reference and calibration STG pulses comprise a first carrier signal, FCS, generated by a satellite local oscillator (SAT-LO), which is modulated by a satellite pulse generator (SAT-PG). At the ground station, they are demodulated by frequency mixing with a second carrier signal (SCS), having the same frequency and generated by a ground station local oscillator (GS-LO). In the same way, reference and calibration GTS pulses comprise the second carrier signal, SCS, generated by the ground station local oscillator (GS-LO), which are modulated by a ground-station pulse generator (GS-PG). At the satellite, they are demodulated by frequency mixing with the first carrier signal (FCS). The two local oscillators SAT-LO and GS-LO are not mutually coherent, therefore the first and second carrier signal, FCS and SCS, are not phase-locked to each other: these means that the complex amplitude values obtained by demodulation are affected by a phase noise, denoted $\phi(x)$ for STG pulses and $\phi(x)$ for GTS pulses. As already discussed, this noise depends on the randomly varying phase offset between the first and second carrier signal and on other hardware effects (time-varying complex gain of RF amplifiers, samplers, etc.). Therefore, when atmospheric and range effects are also considered, the demodulated STG pulses can be expressed as:

$$R_{STG}(x) = C_{sum}^{Tx}(x)A(x)r(x)e^{i\phi(x)}$$

and the demodulated GTS pulses as:

$$R_{GTS}(x) = C_{sum}^{Tx}(x)A(x)r(x)e^{i\phi(x)}$$

The complex gain terms can be expressed as $$C_{sum}^{Tx/Rx}(x) = \sum_{j=1}^{N} \delta_j^{Tx/Rx}(x) S_{nj}^{Tx/Rx}$$

where $\delta_j^{Tx/Rx}(x)$ is the product of the complex gains of all the phase shifters of the j-th TRM that are simultaneously switched in by a PCC configuration generator PCC-CG when the x-th pulse is transmitted/received, $S_{nj}^{Tx/Rx}$ is the straight-through path of the j-th TRM in transmission and reception respectively (at this stage it is not useful to decompose it into its "passive" and "internal" components). In the following, the products $\delta_j^{Tx/Rx}(x)S_{nj}^{Tx/Rx}$ i.e. the complex gains of the transmit and receive path of each TRM in the setting used to transmit/receive the x-th pulse, are denoted $Tx_j(x)$ and $Rx_j(x)$ respectively.

In the method of document EP 0 752 736, one or two phase shifters per TRM are activated, therefore $\delta_j^{Tx/Rx}(x)$ can assume any of the values $d_1^{Tx/Rx}, \ldots, d_p^{TxRx}$ and $d_m^{Tx/Rx} \cdot d_n^{Tx/Rx} \forall m,n \in (1,p)$ and $m \neq n$.

In the method according to FIG. 3, the results of on-satellite demodulation are converted by a satellite elaboration unit SAT-EU into a series of complex amplitude values, i.e. a complex number for each pulse of the GTS pulse train ($R_{GTS}$), therefore they can be transmitted to the ground station in the form of a digital signal DS through a communication subsystem CSS which does not need to be accurately calibrated. In the same way, demodulation of the STG pulse train at the ground station results in a series of complex amplitude values ($R_{STG}$): the whole processing is therefore performed at the ground station by the ground station elaboration unit GS-EU. In order to minimize signal processing on board the satellite, it is even possible, and advantageous, to transmit to the ground station digitized samples of the demodulated GTS pulses, instead of locally extracting the complex amplitude values ($R_{GTS}$). On the contrary, it could also be possible to perform the calibration on board the satellite (in which case the digital signal DS is transmitted from the ground to the satellite) or at a remote calibration station, other than the ground station GS.

As already stated, from a physical point of view, the "complex sum" $C_{sum}^{Tx/Rx}(x)$ represents the far-field interference at the ground station antenna of the APA antenna in the setting used for transmitting/receiving pulse x (which can be a reference or a calibration pulse). From the mathematical point of view, $C_{sum}^{Tx/Rx}(x)$ is an invertible function of the whole set of $\delta_j^{Tx/Rx}(x)$ and $S_{nj}^{Tx/Rx}$: PCC calibration consists in inverting this function. However, in order to be able to do it, it is necessary to remove the parasitic phase, or phase and amplitude, factors, A(x), r(x), and φ(x)/ϕ(x), from the digitized complex amplitude values ($R_{GTS}$, $R_{STG}$). The atmospheric A(x) and range r(x) contributions are the same for the x-th STG and the GTS pulses, thanks to their simultaneity, while the phase noises φ(x) and ϕ(x) are, in general, uncorrelated or only partially correlated to each other. Moreover, A(x) and r(x) are "low frequency" contributions, i.e. they change very little between successive pulses; on the contrary, φ(x) and ϕ(x) can change very rapidly.

FIG. 4A shows the "phase history" of the ground-to-satellite pulses ($\angle R_{GTS}(x)$), demodulated by the satellite local oscillator. The phase of the satellite-to-ground pulses demodulated at the ground station has a very similar shape and has a smooth, quadratic-like phase because it is dominated by the range contribution, which in terms of overall phase changes is orders of magnitude greater than other effects (the TerraSAR-L satellite moves about 2 m between successive pulses). The vertex of the parabola corresponds to the range of closest approach of the satellite to the ground station. It is advantageous, but not mandatory, that half of the pulse train has been transmitted before the range of closest approach.

The inset of FIG. 4A shows a magnified detail of the phase history: it can be seen that, superimposed to the regular, large-scale quadratic phase, there is an irregular noise, which is the most harmful to PCC.

Actually, demodulation does not allow, on itself, to reconstruct the whole accumulated phase of the signals, but only its value modulo 360°. To obtain the "unwrapped" phase history of FIG. 4A it is therefore necessary to resolve the phase ambiguities of the demodulated signals.

A first possibility is to use more elaborated pulses: instead of simply transmitting a carrier modulated by a square transmit and/or receive window, it is possible to modulate the carrier $F_c$ (i.e. 1200 MHz) by a modulating signal with frequency F (i.e. 20 MHz), and possibly lower sub-harmonics F/2, F/4, etc. A numerical example will help to understand how this allows resolving the ambiguity. Consider that the demodulated phase of the carrier $F_c$ and modulating signal F span the whole 0°-360° range. However, the F/2 component is limited between, say, 0° and 220°. This indicates that the phase of $F_c$ and F exceeds 360° and require phase unwrapping, while that of F/2 does not require unwrapping. If for pulse x the carrier phase is 43°, this could actually mean 43°, 43°+360°=403, 43+2×360°=763°, etc. . . . For the same pulse x, the phase shift for F/2 is 210°: this correspond to a shift of the carrier of 210°×2×(1200/20)=25200°. This means that the absolute phase value of the carrier is indeed 25243°, i.e. 360°×70+43°, the discrepancy of 43° being due to amplification of the incertitude in the measurement of the phase of the low-frequency component. Thus, the F/2 signal simplifies phase unwrapping with no ambiguities while the carrier provides the accurate phase value. Actually, a time-varying phase between the carrier and the envelope of the pulses can induce a constant offset between the reconstructed phase histories of STG and GTS signals, but this can be easily corrected.

Actually, a time-varying phase between the carrier and the envelope of the pulses can induce a constant offset between the reconstructed phase histories of STG and GTS signals, but this can be easily corrected.

Another possibility is to use a precise knowledge of the satellite position, provided for example by a GPS receptor, as the range contribution r(x) is by far the largest one. If the knowledge of the position were not precise enough (which could be the case at higher carrier frequencies), it would be possible to combine both approaches.

In the following it is considered that square-wave envelope pulses have been transmitted and GPS estimates of the satellite position, with incertitude of less than one wavelength of the carrier, are available and have been used to unwrap the phase history. Due to inherent GPS limitations, the estimations (GPSPH points with error bars EB on FIG. 4A) are available only each 0.1 to 1 second, corresponding to several hundreds of reference/calibration pulses, therefore GPS only provides an average position, and the range contribution has to be calculated through a polynomial fitting (a quadratic one could be adequate).

In order to compute the A(x) and r(x) terms, it is advantageous to remove the PCC contributions (i.e. the "complex sums" $C_{sum}^{Tx/Rx}(x)$) from the phase and amplitude histories of the demodulated signal. Of course, the actual value of the complex sums is unknown (otherwise, PCC decoding would be directly possible), but "a priori" estimates $C'^{Tx/Rx}_{sum}(x)$ are certainly available: such estimates can be based on internal calibration, pre-launch external calibration or, in the worst case, on nominal (design) values of the antenna components.

By dividing the complex amplitudes $R_{GTS}$ and $R_{STG}$ by said a priori estimates of the PCC contributions, "auxiliary" amplitudes $R^*_{GTS}$ and $R^*_{STG}$ are obtained, which depend only on A(x), r(x) the φ(x)/ϕ(x) phase noises and the unknown differences $\Delta C_{sum}^{Tx/Rx}(x)$ between the actual values of the complex sums and their a priori estimates:

$$R^*_{STG}(x) = \frac{R_{STS}(x)}{C'^{Tx}_{sum}(x)}$$

$$R^*_{GTS}(x) = \frac{R_{GTS}(x)}{C'^{Rx}_{sum}(x)}$$

Figure 4B:
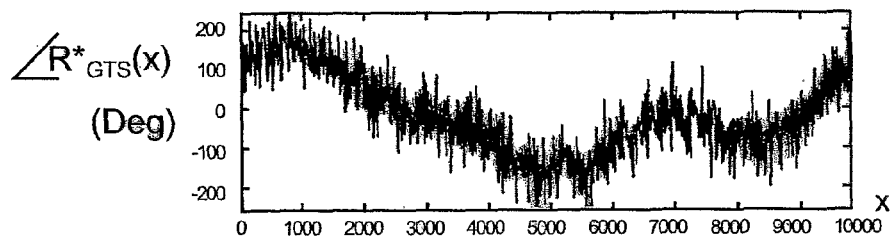

Then, if there is a constant offset between $\angle R^*_{GTS}(x)$ and $\angle R^*_{STG}(x)$, it is removed and a quadratic (or higher order) fit of both data sets is computed, resulting in an estimation of r(x). Then, the estimation of r(x) based on GPS position is fitted to the results of these estimations by varying the GPS estimations within their error bars. More precisely, all the parabolas (or higher order polynomial curves) passing through the error bars of the GPS estimations are considered, and the one having the least mean square error with respect to the average of the fits of $\angle R^*_{GTS}(x)$ and $\angle R^*_{STG}(x)$, (shifted, is necessary, to match the absolute value of the GPS estimates) is selected. Finally, the best fit to the GPS and signal data is subtracted from both $\angle R^*_{GTS}(x)$ and $\angle R^*_{STG}(x)$, The result of this first operation is shown in FIG. 4B: the remaining phase contributions are the atmospheric term A(x) (the low-frequency component of the curve) and the phase noise φ(x) (high frequency contribution). Again, the satellite-to-ground phase history (not shown) is very similar.

The range position estimate can also be used to compute a velocity curve for Doppler frequency shift correction, if required, but this is well known from prior art and will not be discussed further.

Besides introducing the dominant phase contribution, range also exerts an influence on the signal amplitude. However, this range power loss is a well-established calculation and, given the accuracy to which the range can be determined, the range power loss can be considered absolutely accurate. On the contrary, the atmospheric term A(x) is considered to act independently on both amplitude and phase of the signals. However, the same algorithms are used to correct for both, therefore only phase correction is considered in detail.

The atmospheric contribution is not completely unknown: mathematical models and/or independent measurements provides a first estimate which can be directly subtracted from $\angle R^*_{GTS}(x)$ and $\angle R^*_{STG}(x)$. This first estimate is a "starting point" for a more accurate determination of A(x), provides upper and lower bounds for the final result and can be used, together with r(x), for phase unwrapping. In practice, this first estimate accounts for a great part of the atmospheric contribution, leaving only a comparatively small residual contribution to be corrected.

In the most favorable case, the ground station can be co-located with a main GPS station and a GPS satellite occupies a similar portion of the sky: in this case, the GPS system itself provides for said first estimate of the atmospheric complex gain (at least in the L band). After dividing $R^*_{GTS}(x)$ and $R^*_{STG}(x)$ by said first estimate of the atmospheric complex gain, an iterative fitting procedure is applied to compute the atmospheric term. First of all, a linear fit is computed for both STG and GTS data; the fits are averaged and subtracted from the data, which are then cross-correlated. Then a quadratic fit is performed, and so on with increasing polynomial orders until the cross-correlation reaches a minimum. In fact, A(x) is the same for GTS and STG, and therefore it gives a positive contribution to the cross-correlation. It is to preserve the cross-correlation between data sets that the two fits (one for GTS and one for STG phase histories) are averaged into one fit prior to subtraction from the corresponding data. When the cross-correlation is minimized, the best polynomial fit of A(x) has been found and the remaining phase contribution is almost entirely due to the phase noises $\phi(x)/\varphi(x)$ and to $\Delta C_{sum}^{Tx/Rx}(x)$. However, this is only a possibility, and other suitable stop criteria, such as comparison with accurate atmospheric models, can be applied.

Figure 4C:
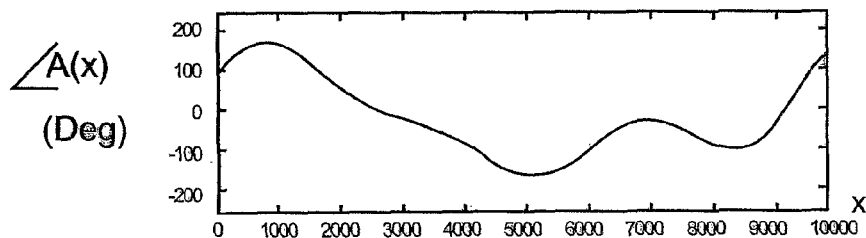
Figure 4D:
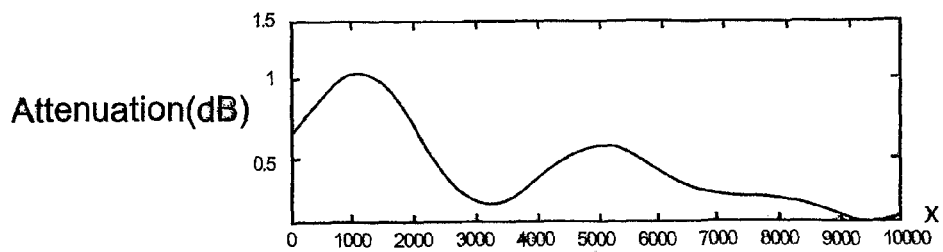

The same procedure can be applied to compute the amplitude component. The results of these fittings are shown in FIGS. 4C (phase) and 4D (attenuation), and they correspond to 16-th order polynomials.

Figure 4E:
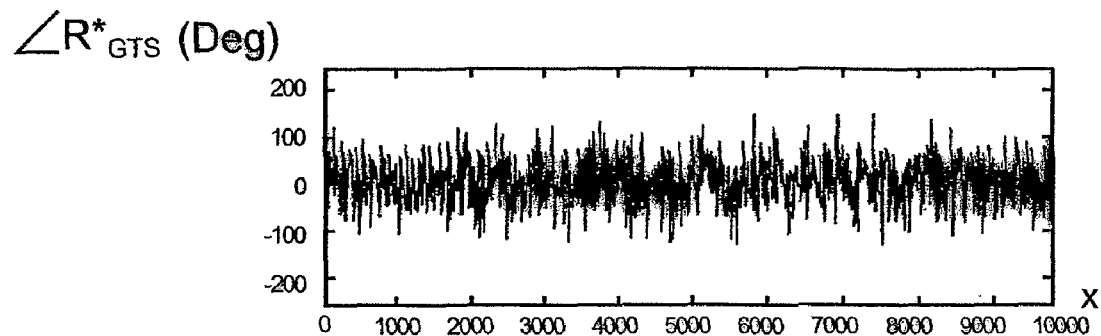

The phase history of ground-to-satellite pulses corrected for both range and amplitude contribution is shown in FIG. 4E.

As it will be discussed below, this procedure also accounts for other phase and amplitude contributions, having properties similar to atmospheric fluctuations, i.e. correlation between STG and GTS data and low frequency. One of these contributions is the variation of satellite attitude, which in TerraSAR-L is known with a 2-mdeg (milli-degrees) accuracy and is supposed to vary by 50 mdeg at most. Another contribution could be a correlated and low-frequency component of the phase noises $\phi(x)/\varphi(x)$.

All the previously discussed operations have been performed using either all the available pulses or only the reference ones. The advantage of using reference pulses is that the imperfectly known PCC contributions affect them in a constant way, i.e. $C_{sum}^{Tx/Rx}(x)$ does not change from a reference pulse to another; moreover, in a preferred embodiment, the "nominal" setting used for transmitting/receiving the reference pulses is such that no phase shifters are switched in, in order to minimize $|\Delta C_{sum}^{Tx/Rx}(x)|$. The next part of the calibration algorithm, which separates the useful information $C_{sum}^{Tx/Rx}(x)$ from the residual parasitic contribution, and particularly from the local oscillator phase noise $\phi(x)/\varphi(x)$, on the contrary, only uses calibration pulses.

After correction for atmospheric and range contribution, the corrected calibration signals are:

$$R'_{STG}(x) = \frac{R_{STG}(x)}{A(x)r(x)} = C_{sum}^{Tx}(x)e^{i\phi(x)} \text{ and}$$

$$R'_{GTS}(x) = \frac{R_{GTS}(x)}{A(x)r(x)} = C_{sum}^{Rx}(x)e^{i\varphi(x)}$$

where $\phi(x)$ and $\varphi(x)$ are redefined to include the residual atmospheric and range contribution which have not been properly accounted for.

Note that the auxiliary amplitudes $R^*_{GTS}(x)$ and $R^*_{STG}(x)$, after having been used to estimate A( ) and r(x) have exhausted their role and can be discarded in the final part of the process.

As already discussed, "a priori" first estimates of the complex sums $C'_{sum}^{Tx/Rx}(x)$ are necessarily available. More precisely, what is directly available is an a priori estimate of the set of complex gains of the transmit path and of the receive path, from which first estimates Tx' and Rx' of the complex gains of the transmit and receive path of each TRM in the setting used to transmit/receive the x-th pulse (the index j and the dependence from x are omitted for the sake of simplicity). Tx' and Rx' are then used to compute first estimates $C'_{sum}^{Tx/Rx}(x)$ of the complex sums.

Therefore, a first estimation of the phase noise can be obtained by dividing the corrected calibration signals by such first estimates of the complex sums:

$$\phi'(x) = \angle\left(\frac{R'_{STG}(x)}{C'^{Tx}_{sum}(x)}\right)$$

$$\varphi'(x) = \angle\left(\frac{R'_{GTS}(x)}{C'^{Rx}_{sum}(x)}\right)$$

Then, a simulated normalized (i.e. with unitary standard deviation) noise $v^{Tx}(x)/v^{Rx}(x)$, having a statistical distribution which is as similar as possible to that of $\phi(x)/\varphi(x)$ (e.g. gaussian) is added to the phase noise estimate, after having been multiplied by a scaling factor $1/\beta$:

$$\tilde{\phi}' = \phi' + \frac{1}{\beta}v^{Tx}(x) \text{ and } \tilde{\varphi}' = \varphi' + \frac{1}{\beta}v^{Rx}(x)$$

The statistical distribution of the phase noise can advantageously be estimated with the help of the reference pulses.

The modified noise estimate is then used to correct the calibration signals, which in turn allows to find second estimates $C''_{sum}^{Tx/Rx}(x)$ of the complex sums:

$$C''^{Tx}_{sum}(x) = \frac{R'_{STG}(x)}{e^{i\tilde{\phi}'(x)}} \text{ and}$$

$$C''^{Rx}_{sum}(x) = \frac{R'_{GTS}(x)}{e^{i\tilde{\varphi}'(x)}}$$

PCC decoding (represented by the symbol $F_{PCC}^{-1}$) is then used to calculate second estimates of the complex gains of the transmit and receive paths:

$$Tx'' = F_{PCC}^{-1}(C_{sum}''^{Tx}(x))$$
$$= F_{PCC}^{-1}\left(\frac{C_{sum}^{Tx}(x)e^{i\phi(x)}}{e^{i\phi'(x)}}\right)$$

$$Rx'' = F_{PCC}^{-1}(C_{sum}''^{Tx}(x))$$
$$= F_{PCC}^{-1}\left(\frac{C_{sum}^{Rx}(x)e^{i\varphi(x)}}{e^{i\varphi'(x)}}\right).$$

These new estimates are then used to calculate third estimates of the complex sums and reiterate the procedure until convergence is reached.

Figure 4F:
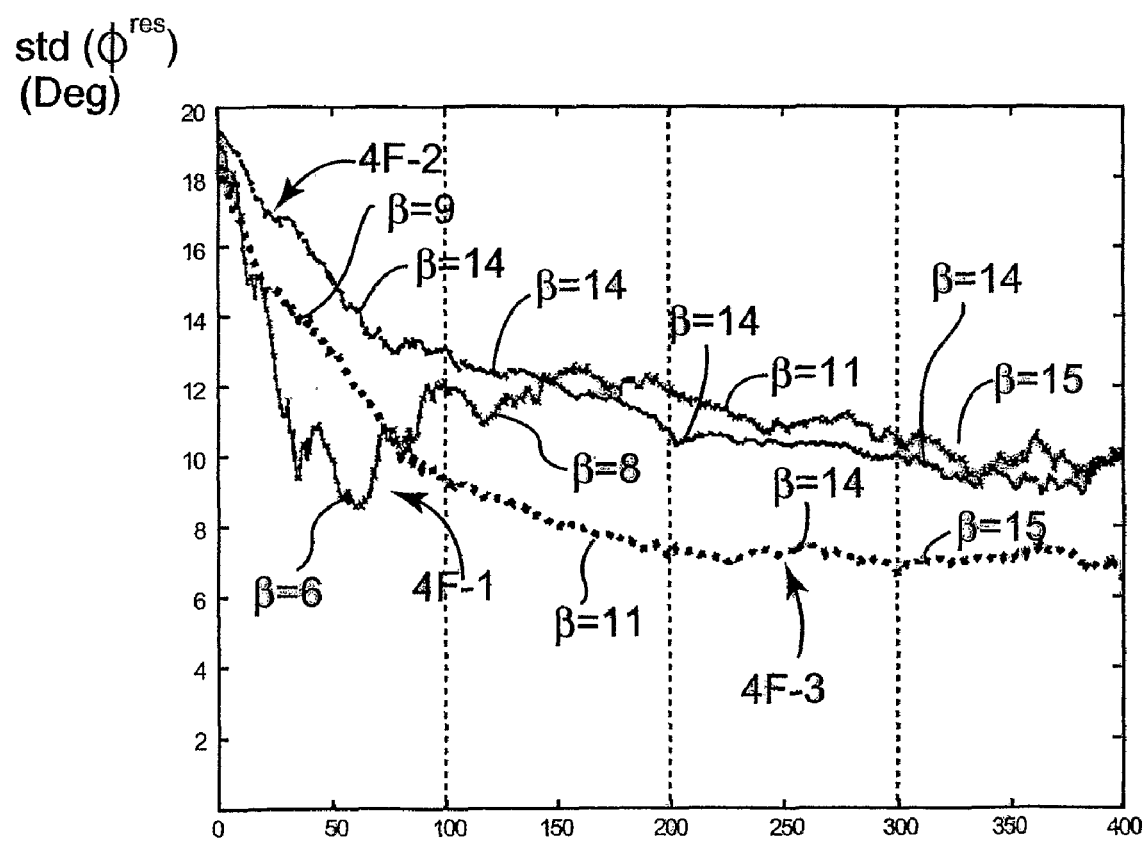

The scaling factor $1/\beta$ is initially set at a relatively high value (i.e. $\beta$ is rather low) to accelerate the convergence of the algorithm and then progressively reduced to avoid divergence. This can be seen from FIG. 4F, which shows the evolution, with the number i of iterations, of the amplitude (standard deviation) of the residual phase error $std(\phi'^{res})$. In the case of curve 4F-1, $\beta$ is initially set at a relatively low value (6): the algorithm converges quickly until about the 50$^{th}$ iteration, and then it starts diverging. Increase of $\beta$ (8, then 11, then 15) avoids catastrophic divergence, but re-convergence is quite slow. In the case of figure 4F-2, $\beta$ is kept at a constant, quite high, value ($\beta=14$): convergence is slow, and even after 400 iterations the phase error is of about 10°. Finally, in the case of figure 4F-3, $\beta$ is initially set at a relatively low value ($\beta=9$), then raised ($\beta=11$, 14 and 15) to avoid divergence. After 200 iterations an accuracy limit of about 7° is reached, then no further improvement is achieved.

Instead of only changing the scaling factor $1/\beta$, and therefore the standard deviation of the noises $v^{Tx}(x)/v^{Rx}(x)$, it is also possible to modify the shape of their statistical distribution in the course of iterations, in order to improve the accuracy limit of the procedure.

The addition of simulated noise deserves some explanation: if the first estimates $\phi'(x)/\phi'(x)$ of phase noise were used without modification, the algorithm could not converge, as the "second estimates" of the complex sums would coincide with the first estimates (i.e. with a priori knowledge). Simulations have shown that addition of a simulated noise having approximately the same statistical distribution of $\phi(x)/\phi(x)$ (apart from a scale factor) is an effective way to obtain convergence, as long as said statistical distribution is not uniform. In the present case, Gaussian distribution has proved to be a good model. PCC decoding at each iteration is important as it has the effect of averaging the simulated phase noises $v^{Tx/Rx}$, thus allowing the algorithm to converge.

Several improvements of the above-described iterative algorithm are conceivable.

For example, it is very advantageous to check, at each iteration of every few iterations, that some reasonable boundaries of the parameter values are not broken: in this case, for example if the calculated phase shift of a phase shifter $d_i^{Tx/Rx}$ is too low or too high, it is replaced by a predefined value.

If a sufficiently accurate internal calibration has been performed, all the calibration parameters are considered known except the passive straight-through paths, and therefore, PCC is only used to determine the straight-through path contributions, $S_n^{Tx/Rx}$. Two separate estimates of the passive straight-through path are obtained by subtracting the known (from internal calibration) internal straight-through path contributions, $S_i^{Tx/Rx}$ from $S_n^{TxRx}$ (determined by external PCC, as described above). Since, as discussed above, the phase of the passive straight-through path is the same in transmission and reception, the average of the two estimates $S_p'^{Tx/Rx}$ is retained:

$$\angle S_p' = \frac{\angle S_p'^{Tx} + \angle S_p'^{Rx}}{2} = \frac{\angle (S_n'^{Tx} - S_i^{Tx}) + \angle (S_n'^{Rx} - S_i^{Rx})}{2}$$

where the prime symbol "'" indicates an external-PCC estimate.

It is possible that PCC accuracy is different for the transmit and receive paths: this can be recognized by comparing the results of external calibration to those of internal calibration (supposed exact). In this case, a better estimate of the passive straight-through path can be obtained using a weighted average of the transmit and receive path estimations:

$$\angle S_p' = w^{Tx}\angle(S_n'^{Tx} - S_i^{Tx}) + w^{Rx}\angle(S_n'^{Rx} - S_i^{Rx})$$

$$w^{Tx} + w^{Rx} = 1$$

where the highest of weights $w^{Tx}$ and $w^{Rx}$ is associated to the most accurate estimate.

Again, reasonable assumptions on the possible variations of the passive straight-through path (due, for example, to geometrical deformations of the APA antenna) are advantageously used to reject aberrant results.

The correction for $A(x)$ and $r(x)$ has been performed assuming known values of the complex sums for the nominal settings used to transmit and receive the calibration pulses. These values are based on a priori knowledge of the calibration parameters and can be replaced by better estimates calculated using PCC data. The whole procedure can then be reiterated using these updated estimates of the nominal settings.

In a second embodiment of the invention ("two-way PCC"), schematically represented in FIG. 5, there is no ground station and the satellite SAT perform the calibration itself, by exploiting reflections from suitable reflection targets RT on Earth.

The satellite sends three kinds of pulses:
- transmit-path calibration pulses (TCP), transmitted using PCC encoding and received, after reflection, with the antenna in a nominal setting;
- receive-path calibration pulses (RCP), transmitted with the antenna in a nominal setting and received, after reflection, using PCC encoding;
- reference pulses (RP), transmitted and received with the antenna in a nominal setting.

The ground reflector RT can be a natural flat surface, such as a lake or ice; in this case, nadir mirror-like reflection is advantageously employed. A suitable dimension of a nadir target, considering the speed of the satellite (i.e. 7400 m/s) and the time needed to complete calibration (i.e. 10 secs), is 20 km×75 km. Man-made reflectors can be used, too, but since they are much smaller and probably at a further slant range the reflected strength of the received signal is reduced. However, they offer advantages as they are more stable targets.

The demodulated transmit-path calibration, receive-path calibration and reference pulses are given by:

$$R_{Tx}(x) = C_{sum}^{Tx}(x) C_{sum}^{RxNom}(x) A^2(x) r^2(x) e^{i\sigma(x)}$$

$$R_{Rx}(x) = C_{sum}^{Rx}(x) C_{sum}^{TxNom}(x) A^2(x) r^2(x) e^{i\sigma(x)} \text{ and}$$

$$R_{Ref}(x) = C_{sum}^{TxNom}(x) C_{sum}^{RxNom}(x) A^2(x) r^2(x) e^{i\sigma(x)}$$

where $C_{sum}^{TxNom}(x)$ and $C_{sum}^{RxNom}(x)$ are the complex sums in transmission and reception when the antenna is in a nominal mode.

Note that in the first embodiment of the invention, for each value of the parameter x there is a couple of pulses, a GTS one and a STG one. Here, for each value of x there is only one "two way" (STG-GTS) pulse, which can be a transmit path calibration pulse, a receive pulse calibration pulse or a reference pulse. However, this is only a question of notation: the total number of calibration pulses does not change, therefore the maximum value reached by parameter x in the second embodiment is the double than in the first one.

Range and atmospheric contributions are squared to account for the fact that the pulses perform a two-way trip, as it is assumed that these contributions do not change significantly during the pulse travel time. A satellite orbiting at 800 km moves approximately 40 m along track during this travel time (about 0.5 millisecond), which means that, near the closest approach, range changes of less than 0.5 mm; therefore the assumption is reasonable.

The phase noise contributions $\phi(x)/\varphi(x)$ are not present anymore (or, at least, their importance is greatly reduced), as there is only one local oscillator, SAT-LO, which generates both carrier signals (the one to be modulated and the one used for demodulation). However, they are replaced by a phase contribution due to the reflector roughness, $\sigma(x)$. It is important to observe that what is really important is the "high frequency" roughness, inducing a phase variation from pulse to pulse. Large-scale non-planarity of the target, e.g. earth curvature, is unimportant, as it gives rise to low-frequency phase contributions, which are corrected together with atmospheric contribution. If the self-correlation time of the satellite local oscillator SAT-LO were shorter than the pulse travel time, the method could still be applied, the only difference being the fact that $\sigma(x)$ would account for both reflector roughness and oscillator phase noise.

As for $\phi(x)$ and $\varphi(x)$, the statistical distribution of $\sigma(x)$ is of the uttermost importance for the convergence of the iterative algorithm used in calibration: if this distribution is uniform, no improvement of the successive estimates is possible. Bi-static GPS experiments have shown that, as long as the reflector surface roughness is smaller than a half-wavelength of the carrier (i.e. about 10 cm in L-band), $\sigma(x)$ follows a gaussian-like distribution, therefore the algorithm converges. As a consequence, the ocean is probably not a suitable reflecting surface, but large lakes and possibly certain areas of the ice pack are.

Two-way calibration is performed substantially in the same way as in the pulsed reference scheme: first of all, range and atmospheric contribution are accounted for, then an iterative algorithm is used to improve an initial estimate of the calibration parameters. The whole procedure can then be reiterated with improved estimates of nominal settings.

In a third embodiment of the invention, calibration pulses are not transmitted. This "no-reference pulse" scheme can be used with a ground station, like in the "pulsed reference scheme" or with ground reflections, like in the "two-way scheme".

Calibration pulses cannot be directly used to determine the atmosphere and range contributions, because they are affected by the phase factors $C_{sum}^{Rx/Tx}(x)$, which vary at high frequency, unlike reference pulses, for which the complex sum is a constant, as the APA antenna is in a "nominal" setting. As a priori knowledge of the complex sums is available, it is possible to simulate reference pulses by dividing the received calibration pulses by the estimated complex sums $C'_{sum}^{Rx/Tx}(x)$, then calibration is performed like in the first or second embodiment.

Replacing reference pulses with corrected calibration pulses increases the residual noise, not correctly accounted for by the range and atmospheric correction steps, but this drawback can be compensated by the significant advantages of this scheme. In fact, the "no-reference pulse scheme" is particularly attractive as reference pulses give access only to atmospheric and range terms, while calibration pulses also provide calibration information. The duration of the calibration procedure is limited by the orbital movement of the satellite with respect to the ground station (for TerraSAR-L the calibration window is of about 20-30 seconds if using a ground station): if only calibration pulses are transmitted, more independent calibrations can be performed, and their results can be averaged, which leads to an accuracy improvement.

Moreover, the calibration results can advantageously be used to update the estimations of the complex sums used to compute simulated reference pulses and the whole procedure is reiterated.

However, this is true only if the PCC configuration generator PCC-CG is fast enough to allow for the transmission of a great number of PCC pulses in a limited time. If this is not the case, instead of reducing the pulse rate, it is preferable to transmit and receive reference pulses, which provide for useful information. Moreover, the use of reference pulses simplifies the signal processing required for estimation of A(x) and r(x).

FIG. 6 is a flow-chart of a PCC external calibration process according to the invention, summarizing the above description.

Step 1 consists in transmitting and receiving PCC encoded pulses and, optionally, reference pulses. Encoding can be performed in transmission, for STG pulses, or in reception, for GTS pulses.

In step 2, the "auxiliary" amplitudes $R^*_{GTS}$ and $R^*_{STG}$, used to find the range and atmospheric contribution, are calculated, by dividing the complex amplitude of the demodulated pulses by a priori estimates of the associated "complex gains".

Step 3 is the resolution of range-induced phase ambiguities and the correction for range contribution r(x), performed using independent (from PCC) determination of the satellite position and/or attitude, e.g. GPS alone or in combination with the reference pulses. Due to the limited number of GPS estimations, this correction is not complete, but limited to the dominant, low-order components. More generally, step two relates to the correction for any phase and/or amplitude contribution resulting from physical parameters related to predictable motion vectors that can be directly measured: for this reason, in the flow-chart, it is more generally defined "Correction of contributions due to position/velocity parameters".

Step 4 is the correction for atmospheric contribution, A(x), which uses a priori knowledge of the system: initial estimates of $C_{sum}^{Tx/RxNom}(x)$ and/or $C_{sum}^{Tx/Rx}(x)$, non-correlation of transmit path and receive path phase noise and model of the atmospheric contribution in transmission and reception. Step 4 can be performed using "real" calibration pulses (first embodiment) or "simulated" ones (third embodiment). Besides atmospheric fluctuations, other effects such as attitude fluctuations or higher-order components of the range contribution (if in-appropriately corrected in step 2), can induce low-frequency phase and amplitude contributions with an high correlation between the transmit and receive path: regardless of their physical origin, all these contributions are accounted for by step 3. For this reason, in the flow-chart, this step is not labeled "atmospheric correction", but, more generally, "Correction of correlated, low-frequency contributions".

Moreover, the invention is not limited to the particular embodiment of step 4 described above (iterative polynomial fitting): step 4 can also be performed by any other method known by the person skilled in the art of RF communications, such as the use of occultation data with other satellites.

As it is shown by the dashed lines directly connecting step 1 or 3 and step 5, in some circumstances atmospheric and other correlated low-frequency contributions can be neglected (see the cited article from D. S. Purdy and A. Jacomb-Hood): such a case is comprised as a particular embodiment of the present invention, as long as step 5 is performed. Even if correlated, low-frequency contributions are not negligible, it is possible, at least in principle, to omit step 4, as step 5 can account even for these terms. Of course, convergence would be much slower and the overall accuracy would be less good. In general, it is advantageous to make use of any available piece of information to simplify the task of step 5 by removing "predictable" contributions.

Step 5 is the core of the invention: the iterative algorithm for rejecting the remaining parasitic contributions and simultaneously obtaining the best estimates of the unknown calibration parameters.

Sub-step 5.1 is the determination of first "a priori" estimates of the calibration parameters, i.e. of the complex gains of the transmit and receive path, Tx' and Rx', from which are computed, at sub-step 5.2 first estimates of the complex sums" $C_{sum}^{Tx/Rx}(x)$ Sub-step 5.3 is the calculation of estimates of the phase noises $\phi(x)$ and $\varphi(x)$ (or $\sigma(x)$ for the "two-way scheme") by dividing the demodulated signals (already corrected for the contributions due to measured orbital parameters—step 3—and, if necessary, for correlated, low-frequency contributions—step 4) by said estimates of the complex sums.

Sub-step 5.4 is the addition of a simulated phase noise to the estimates calculated in sub-step 5.3, resulting in modified estimates. Reducing the standard deviation of the simulated phase noise as iteration proceeds helps ensuring the convergence of the algorithm.

Sub-step 5.5 is PCC-decoding of said improved estimates of the "complex sums" to find improved estimates of the complex gains (Tx" and Rx"). Optionally, in sub-step 5.6, a priori knowledge is used for a further improvement of these estimates: check of boundary values, averaging of passive straight-through-path estimations, etc.

The improved estimates of the transmit and receive module data complex gains (after sub-step 5.5 or 5.6) are injected back into sub-steps 5.2 (to calculate new $C_{sum}$s) to 5.5 or 5.6 until convergence is reached.

When convergence is reached, the last estimates of the transmit and receive module complex gains constitute the output of the algorithm.

If a priori knowledge of the system has been used in step 2, the calibration algorithm (steps 3 to 5) can be reiterated by replacing said a priori knowledge with the improved estimates obtained at step 5 (dashed line).

If several complete sets of PCC pulses have been transmitted (particularly in the "no-reference pulse" scheme), several independent calibrations can be performed and the results averaged.

Even if only the case of transmit and receive path calibration has been described, it is clear that the invention also applies to transmit-path only or receive-path only calibration, as the two data set are processed independently. This could be important, for example, in the case of communication APA antenna, which may be unidirectional. In this case, TRMs can be replaced by transmit modules or receive modules.

In the preceding discussion, only the case of a satellite-borne APA antenna has been considered, but it is clear that this is only an example of a particularly useful application of the method of the invention, which is also adapted to airborne, ship-borne or even fixed APA antennas (in this last case, step 2 of FIG. 5 may be omitted). It is also clear that said APA antenna does not need belonging to a SAR, and communication antennas can be calibrated in the same way; particularly in this case, only the transmit or the receive path can be calibrated. Moreover, even if reference has been made to the L-band, the method of the invention is not limited to any particular radio band, or even the electromagnetic spectrum as it could be applied to any multi-element system such as an acoustic sonar array.

Finally, even if pulse-coded calibration is particularly advantageous, use of a "trivial" encoding (only one phase shifter switched in at a time) is also compatible with the method of the invention.

The invention claimed is:

1. A method for remotely calibrating a phased array system (APA), comprising a number of transmit and/or receive modules (TRM), wherein the transmit gain ($\delta_j^{Tx}$) of each transmit and/or receive module can be set to one of a first collection of complex values ($S_n^{Tx}$, $d_1^{Tx} \cdot S_n^{Tx}$ ... $d_p^{Tx} \cdot S_n^{Tx}$, $d_i^{Tx} \cdot d_j^{Tx} \cdot S_n^{Tx}$...), and/or the receive gain ($\delta_j^{Rx}$) of each transmit and/or receive module can be set to one of a second collection of complex values ($S_n^{Rx}$, $d_1^{Rx} \cdot S_n^{Rx}$ ... $d_p^{Rx} \cdot S_n^{Rx}$, $d_i^{Rx} \cdot d_j^{Rx} \cdot S_n^{Rx}$...), said method comprising the steps of:

i) generating a first (FCS, CS) and a second carrier signal (SCS, CS);

ii) generating a first pulse train by modulating said first carrier signal (FCS, CS) and transmitting it using the phased array system (APA), wherein the transmit gain values of the transmit and/or receive modules (TRM) are set according to a pattern that changes during the transmission of said first pulse train; and/or receiving a second pulse train, generated by modulating said second carrier signal (SCS, CS), using the phased array system (APA), wherein the receive gain values of the transmit and/or receive modules (TRM) are set according to a pattern that changes during the reception of said first pulse train;

iii) demodulating said first pulse train using the second carrier signal (SCS, CS) and/or said second pulse train using the first carrier signal (FCS, CS), in order to determine a first ($R_{STG}(x)$, $R_{Tx}(x)$) and/or second ($R_{GTS}(x)$, $R_{Rx}(x)$) series of complex amplitude values, wherein said first series of complex amplitude values is a first invertible function ($C_{sum}^{Tx}(x)$) of said transmit gains of all the transmit and/or receive modules, affected by at least a first parasitic phase contribution ($e^{i\Phi(x)}$, $e^{i\sigma(x)}$), and/or said second series of complex amplitude values is a second invertible function ($C_{sum}^{Rx}(x)$) of said receive gains of all the transmit and/or receive modules, affected by at least a second parasitic phase contribution ($e^{i\Phi(x)}$, $e^{i\sigma(x)}$);

iv) communicating said first and/or second series of complex amplitude values to a calibration elaboration unit (GS-EU, SAT-EU);

v) removing said first ($e^{i\Phi(x)}$, $e^{i\sigma(x)}$) and/or second ($e^{i\Phi(x)}$, $e^{i\sigma(x)}$) parasitic phase contributions from said first ($R_{STG}(x)$, $R_{Tx}(x)$) and/or second ($R_{GTS}(x)$, $R_{Rx}(x)$) series of complex amplitude values to obtain estimates of said first ($C_{sum}^{Tx}(x)$) and/or second ($C_{sum}^{Rx}(x)$) invertible functions;

wherein step v) comprises the operations of:
  a. determining first estimates of each individual complex value belonging to said first and/or second collection of complex values from a priori knowledge of the transmit and/or receive complex gain of each transmit and/or receive module (TRM);
  b. computing first estimates of said first ($C_{sum}^{Tx}(x)$) and/or second ($C_{sum}^{Rx}(x)$) invertible functions from said first estimates of each individual complex value belonging to said first and/or second collection of complex values;
  c. computing estimates of said first ($e^{i\Phi(x)}$, $e^{io(x)}$) and/or second ($e^{i\Phi(x)}$, $e^{io(x)}$) parasitic phase contributions by removing said estimates of the first ($C_{sum}^{Tx}(x)$) and/or second ($C_{sum}^{Rx}(x)$) invertible functions from said first ($R_{STG}(x)$, $R_{Tx}(x)$) and/or second ($R_{GTS}(x)$, $R_{Rx}(x)$) series of complex amplitude values;
  d. modifying said estimates of the first ($e^{i\Phi(x)}$, $e^{io(x)}$) and/or second ($e^{i\Phi(x)}$, $e^{io(x)}$) parasitic phase contributions by adding a first ($v^{Tx}$) and/or second ($v^{Rx}$) simulated phase noises, both having a pre-determined standard deviation ($1/\beta$) and a non-uniform statistical distribution;
  e. updating said estimates of said first ($C_{sum}^{Tx}(x)$) and/or second ($C_{sum}^{Rx}(x)$) invertible functions by removing from said first ($R_{STG}(x)$, $R_{Tx}(x)$) and/or second ($R_{GTS}(x)$, $R_{Rx}(x)$) series of complex amplitude values the modified estimate of the parasitic phase contributions determined in operation d.
  f. updating the estimates of the individual complex values belonging to said first ($S_n^{Tx}$, $d_1^{Tx} \cdot S_n^{Tx}$ ... $d_p^{Tx} \cdot S_n^{Tx}$, $d_i^{Tx} \cdot d_j^{Tx} \cdot S_n^{Tx}$ ...) and/or second ($S_n^{Rx}$, $d_1^{Rx} \cdot S_n^{Rx}$ ... $d_p^{Rx} \cdot S_n^{Rx}$, $d_i^{Rx} \cdot d_j^{Rx} \cdot S_n^{Rx}$ ...) collections by inverting said updated estimates of said first and/or second invertible functions;
and reiterating operations b. to f.

2. A method according to claim 1, wherein step v) further comprises comparing said estimates of said first ($C_{sum}^{Tx}(x)$) and/or second ($C_{sum}^{Rx}(x)$) decoded invertible functions with said "a priori" knowledge of the transmit and receive gain of each transmit and receive module in order to reject aberrant estimates and to replace them with predetermined values.

3. A method according to claim 1, wherein the statistical distribution of said first ($v^{Tx}$) and/or second ($v^{Rx}$) simulated phase noise is modified from one iteration of step v) to another in order to ensure a convergence of the estimation procedure.

4. A method according to claim 1, wherein the transmit and/or receive gain values of the transmit and/or receive modules are set according to a pulse-coded calibration encoding pattern for at least a first subset (TCP, RCP) of the pulses belonging to said first and/or second pulse train and operation f. of step v) of the method comprises performing a pulse-coded calibration decoding of said first subset of pulses.

5. A method according to claim 1, wherein said first ($R_{STG}(x)$, $R_{Tx}(x)$) and/or second ($R_{GTS}(x)$, $R_{Rx}(x)$) series of complex amplitude values are also affected by a third parasitic phase and amplitude contribution (r(x)), which depends on a first set of measurable physical parameters, and wherein said third parasitic phase and amplitude contribution is removed before performing step v) of the method by making use of a measurement (GPSPH) of said first set of physical parameters.

6. A method according to claim 5, wherein said first set of measurable physical parameters includes a time-varying position of said phased array system.

7. A method according to claim 1, wherein both said first ($R_{STG}(x)$, $R_{Tx}(x)$) and second ($R_{GTS}(x)$, $R_{Rx}(x)$) series of complex amplitude values are also affected by a fourth parasitic phase, or phase and amplitude, contribution (A(x)), which depends on a second set of physical parameters which vary on a time scale much longer than the interval separating two pulses of said first and/or second pulse train, and wherein said fourth parasitic phase, or phase and amplitude, contribution is removed before performing step v) of the method.

8. A method according to claim 4 wherein both said first ($R_{STG}(x)$, $R_{Tx}(x)$) and second ($R_{GTS}(x)$, $R_{Rx}(x)$) series of complex amplitude values are also affected by a fourth parasitic phase, or phase and amplitude, contribution (A(x)), which depends on a second set of physical parameters which vary on a time scale much longer than the interval separating two pulses of said first and/or second pulse train, and wherein said fourth parasitic phase, or phase and amplitude, contribution is removed before performing step v) of the method, and wherein the transmit and/or receive gain values of the transmit and/or receive modules (TRM) are set according to a pulse-coded calibration encoding pattern for only a first subset (TCP, RCP) of the pulses belonging to said first and/or second pulse train, while they are set according to a fixed pattern for a second subset (TRP, RRP, RP) of the pulses, said second subset being used to remove said fourth parasitic phase, or phase and amplitude, contribution (A(x)), but not to perform step v) of the method.

9. A method according to claim 8, wherein removal of said fourth parasitic phase, or phase and amplitude, contribution (A(x)) comprises repeatedly fitting said fourth parasitic phase, or phase and amplitude, contribution with suitable fitting functions until a suitable stop criterion is met.

10. A method according to claim 9, wherein said stop criterion is the fact that the cross-correlation between said first ($R_{STG}(x)$, $R_{Tx}(x)$) and second ($R_{GTS}(x)$, $R_{Rx}(x)$) series of complex amplitude values reaches a minimum.

11. A method according to claim 9, wherein said fitting functions are polynomials of increasing orders.

12. A method according to claim 7, wherein said second set of physical parameters comprises the characteristics of the medium through which the first and/or second pulse train propagate.

13. A method according to claim 1, wherein said first ($e^{i\Phi(x)}$) and/or second ($e^{i\Phi(x)}$) parasitic phase contributions are originated by hardware-induced phase noises affecting said first (FCS) and second (SCS) carrier signals.

14. A method according to claim 1, wherein said first carrier signal (FCS) is generated by a first local oscillator (SAT-LO) co-located with the phased array system (APA) and said second carrier signal (SCS) is generated by a second local oscillator (GS-LO) located at a remote station (GS) which receives said first pulse train and/or transmits said second pulse train, and wherein said first (FCS) and second (SCS) carrier signal, if both are present, may be mutually incoherent.

15. A method according to claim 1, wherein said first and second carrier signals (CS) are both generated by a local oscillator (SAT-LO) co-located with the phased array system (APA) and are both transmitted from said phased array system, reflected by a remote reflecting target (RT) and received by the same phased array system, and wherein said first and second parasitic phase contributions ($e^{io(x)}$) are originated by variations in the radar cross section of said remote reflecting target (RT).

16. A method according to claim 15, wherein the receive gain values of the transmit and receive modules (TRM) are set according to a fixed pattern during reception of the first pulse train and wherein the transmit gain values of the transmit and receive modules are set according to a fixed pattern during transmission of the second pulse train.

17. A method according to claim 15, wherein the first and second pulse train are interleaved.

18. A method according to claim 1, wherein said phased array system (APA) is a phased array antenna.

19. A method according to claim 18, wherein said antenna is carried by a satellite (SAT).

20. A method according to claim 12, wherein said antenna is carried by a satellite (SAT) and, wherein said remote station is a ground station (GS).

21. A method according to claim 13, wherein said antenna is carried by a satellite (SAT) and said remote reflecting target (RT) is a ground target.

* * * * *

UNITED STATES PATENT AND TRADEMARK OFFICE
CERTIFICATE OF CORRECTION

PATENT NO.        : 7,446,698 B2                              Page 1 of 1
APPLICATION NO.   : 10/589880
DATED             : November 4, 2008
INVENTOR(S)       : Bast It is certified that error appears in the above-identified patent and that said Letters Patent is hereby corrected as shown below:

Column 18, line 46:
"pattern that changes during the reception of said first" SHOULD READ:
"pattern that changes during the reception of said second"

Signed and Sealed this

Fifth Day of January, 2010

David J. Kappos
*Director of the United States Patent and Trademark Office*